United States Patent
Vilander et al.

(10) Patent No.: US 6,804,720 B1
(45) Date of Patent: Oct. 12, 2004

(54) MOBILE INTERNET ACCESS

(75) Inventors: Harri Tapani Vilander, Espoo (FI); Petri Aulis Jokela, Espoo (FI); Raimo Vuopionperä, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 681 days.

(21) Appl. No.: 09/588,603

(22) Filed: Jun. 7, 2000

(51) Int. Cl.$^7$ .............................................. G06F 15/16
(52) U.S. Cl. ...................... 709/229; 709/217; 709/218; 370/338
(58) Field of Search .................................. 709/205, 217, 709/218, 245, 229; 370/352, 329, 546, 356, 401, 389, 338; 379/111

(56) References Cited

U.S. PATENT DOCUMENTS

| | | | |
|---|---|---|---|
| 5,708,655 A | | 1/1998 | Toth et al. |
| 5,898,780 A | | 4/1999 | Liu et al. |
| 5,905,736 A | * | 5/1999 | Ronen et al. ............... 370/546 |
| 5,956,391 A | * | 9/1999 | Melen et al. .......... 379/114.01 |
| 6,104,711 A | * | 8/2000 | Voit ........................... 370/352 |
| 6,195,705 B1 | * | 2/2001 | Leung ........................ 709/245 |
| 6,240,091 B1 | * | 5/2001 | Ginzboorg et al. ......... 370/401 |
| 6,250,557 B1 | * | 6/2001 | Forslund et al. ........... 235/492 |
| 6,366,893 B2 | * | 4/2002 | Hannula et al. ............. 705/40 |
| 6,466,571 B1 | * | 10/2002 | Dynarski et al. .......... 370/352 |
| 6,484,211 B2 | * | 11/2002 | Turunen ..................... 709/245 |
| 6,519,252 B2 | * | 2/2003 | Sallberg ..................... 370/356 |
| 6,535,493 B1 | * | 3/2003 | Lee et al. ................... 370/329 |
| 6,542,497 B1 | * | 4/2003 | Curry et al. ................ 370/352 |
| 6,567,664 B1 | * | 5/2003 | Bergenwall et al. ........ 455/435 |
| 6,614,774 B1 | * | 9/2003 | Wang ......................... 370/338 |
| 2002/0191575 A1 | * | 12/2002 | Kalavade et al. ........... 370/338 |
| 2003/0051041 A1 | * | 3/2003 | Kalavade et al. ........... 709/229 |

FOREIGN PATENT DOCUMENTS

| | | |
|---|---|---|
| WO | 97/40615 | 10/1997 |
| WO | 98/32301 | 7/1998 |
| WO | 99/33291 | 7/1999 |

* cited by examiner

*Primary Examiner*—David Wiley
*Assistant Examiner*—Phuoc H Nguyen (57) ABSTRACT

A method of authorizing an Internet Protocol (IP) enabled mobile host 1 to access the Internet 2 via an wireless LAN, GSM, UMTS access network 3 comprises initially sending an IP access request from the mobile host 1 to an IP router 5 within the access network 3. In response to receipt of said access request at the IP router 5, an IP address routing prefix is sent from the IP router 5 to the mobile host 1. Electronic cash is then forwarded from the mobile host 1 to a control point 6 within the access network 3. The control point 6 confirms the authenticity and/or sufficiency of the electronic cash and, providing that confirmation is made, sends an authorization message to the IP router 5. The IP router 5 blocks the transmission of IP packets between the mobile host 1 and the Internet 2 prior to receipt of the authorization message and permits the passage of IP packets only after an authorization message has been received.

19 Claims, 5 Drawing Sheets

MOBILE INTERNET ACCESS

FIELD OF THE INVENTION

The present invention relates to mobile Internet access and in particular, though not necessarily, to mobile Internet access with a mobile wireless host.

BACKGROUND TO THE INVENTION

With the increasing use of the Internet, interest has grown in the possibility of accessing the Internet using mobile hosts which are able to roam between access networks. These access networks may be networks to which the mobile hosts are connected via fixed lines or may be wireless networks to which the mobile hosts are connected using a radio interface. Examples of fixed line networks are Ethernet networks whilst examples of wireless networks are mobile telephone networks as well as wireless Local Area Networks (LANs).

A difficulty which must be overcome in order to fully implement mobile Internet access with roaming, is the need to authenticate and/or authorise a roaming host (or rather the subscriber using the mobile host) which uses a foreign network as its access network. It is generally envisaged that such a roaming host should belong to a subscriber of some other network, i.e. the subscriber's 'home' network, and that the foreign access network must contact this home network in order to authorise the roaming host.

One disadvantage of this proposal is that it does not enable a mobile host to access the Internet anonymously. That is to say that in order to access the Internet a roaming host must disclose its identity either to the access network or to some other home network. Another disadvantage is that a trust relationship must exist between the home network and the access network in order that the networks can confidently exchange billing information. Whilst it may be straightforward to establish a trust relationship between two telecoms operators for example, it may be more difficult where the access network is a wireless Local Area Network operated, for example, in an Internet café.

SUMMARY OF THE INVENTION

According to a first aspect of the invention there is provided a method of authorising an Internet Protocol (IP) enabled mobile host to access the Internet via an access network, the method comprising:
- negotiating an IP address between the mobile host and the access network and/or other hosts attached to the access network;
- sending electronic cash or other authentication message from the mobile host to a control point within the access network; and
- confirming at the control point the authenticity of said electronic cash or authentication message and, providing that confirmation is made, sending an authorisation message from the control point to an IP node,
- wherein the IP node blocks the transmission of IP packets between the mobile host and the Internet prior to receipt of said authorisation message and permits the passage of IP packets only after an authorisation message has been received.

Anonymous access is possible where a mobile host has access to electronic cash which can be transferred from the mobile host to the access network. Providing that sufficient electronic cash is transferred to the access network, the access network may authorise the mobile host to access the Internet without the need to refer to some other home network of the mobile host.

It will be appreciated that the present invention is applicable in particular to IPv6.

Preferably, upon receipt of the electronic cash at the control point, the control point contacts a bank, or other electronic cash provider or node of the access network, in order to authenticate and ensure the sufficiency of the received electronic cash. Providing that the bank (or cash provider or other node) returns a confirmation or authentication message to the control point, the control point is able to send the authorisation message to the IP node in order to allow the passage of IP data packets between the mobile host and the Internet.

Preferably, electronic cash payments are incorporated into IP packets sent from the mobile host to the control point. More preferably, the payments are incorporated into the option field of IP packets. Other payment related messages may also be incorporated into IP packets. These include; a price enquiry message sent from the mobile host to the control point, a price list message sent from the control point to the mobile host, and a request for further payment also sent from the control point to the mobile host.

As an alternative to the use of electronic cash, the mobile host may transmit a password or certificate to the control point. The authenticity of the password or certificate may then be checked with a foreign network operator or the like.

Preferably, said IP node provides routing functionality for IP data packets. This node may also provide for protocol conversion between the carrier protocol used by the access network, and that used by the Internet. However, where the carrier protocol of the access network is compatible with that of the Internet, no such conversion may be required. The control point and the IP node may be co-located. Electronic cash or said other authentication message may be sent to the control point via the router. The payments may be piggy-backed onto IP datagrams. Payments or authorisation messages may be extracted by the router and forwarded to the control point.

Preferably, said step of negotiating an IP address is carried out in response to the sending of an IP access request from the mobile host to said IP node within the access network. Alternatively, the negotiation may be initiated by receipt of a network advertisement message broadcast by the access network.

The step of negotiating an IP address between the mobile host and the access network may comprise sending an IP address or part thereof from the IP node, or another network node, to the mobile host. In certain embodiments of the present invention, subsequent to receipt of the access request at the IP node, the IP node or other network node returns to the mobile host an IP address prefix. The remainder of the IP address may be provided or generated by the mobile host itself. This remaining part of the IP address may be an International Mobile Subscriber Identity (IMSI) code in the case where the access network is a mobile telephone network and the mobile host is a mobile telephone host or the like. Where the access network is a fixed line access network, the remaining part of the IP address may be the address of the mobile host within that network, e.g. an Ethernet address in the case of an Ethernet network.

Said other network node may be a DHCP server. The control point may be incorporated into the DHCP server, so that the e-cash payments are received by the DHCP server. The DHCP server sends open and close messages to said IP node to unblock or block the flow of IP packets to and from said IP node.

The term "negotiating" used above encompasses a step of sending a Neighbour Solicitation message from the mobile host to other hosts connected to the network. In the event that there is an IP address collision, a host may respond by sending a Neighbour Advertisement message to the mobile host.

The access network may be a wireless Local Area Network (LAN) or Wide Area Network (WAN). In this case, where the IP node returns a part of an IP address, the remainder of the address may correspond to the address of the host in the access network, e.g. an Ethernet address. Alternatively, the access network may be a mobile telecommunications network such as a GSM network or a UMTS network.

Preferably, the method of the present invention comprises temporarily allocating to the mobile host a home agent located in the access network. More preferably, this allocation exists for the duration of the Internet connection. The home agent is responsible for routing datagrams to the mobile host in the event that the mobile host roams within the access network and may also remain responsible when the mobile host roams out of the access network into a new access network.

Preferably, the method comprises informing an Internet server of the IP address allocated to the mobile host, or of an IP address of an allocated home agent. The server maintains a mapping between mobile host identities and temporary IP addresses/home agent addresses for subscribing mobile hosts. A correspondent host wishing to communicate with the mobile host sends a mobile host identifier to the server. The server may either forward the message to the mobile host or may return the temporary address to the correspondent host. In the former case, the Internet server may be a Call Control server (using the Session Initiation Protocol (SIP)), whilst in the latter case the Internet server may be a Domain Name System (DNS) server.

According to a second aspect of the present invention there is provided apparatus for use in enabling an Internet Protocol (IP) enabled mobile host to access the Internet, the apparatus comprising:

means for conducting a negotiation between the mobile host and the access network and/or other hosts attached to the access network to allocate a mobile address to the mobile host; and a control point within the access network for receiving electronic cash or other authentication message sent from the mobile host and for confirming the authenticity of the sent electronic cash or authentication message and, providing that confirmation is made, for sending an authorisation message to an IP node, the IP node being arranged in use to block the transfer of messages between the mobile host and the Internet prior to receipt of an authorisation message from the control point and being arranged to allow the transfer upon receipt of the authorisation message.

BRIEF DESCRIPTION OF THE DRAWINGS

FIG. 3b illustrates further signalling in the embodiment of FIG. 3a;

DETAILED DESCRIPTION OF CERTAIN EMBODIMENTS

Figure 1:
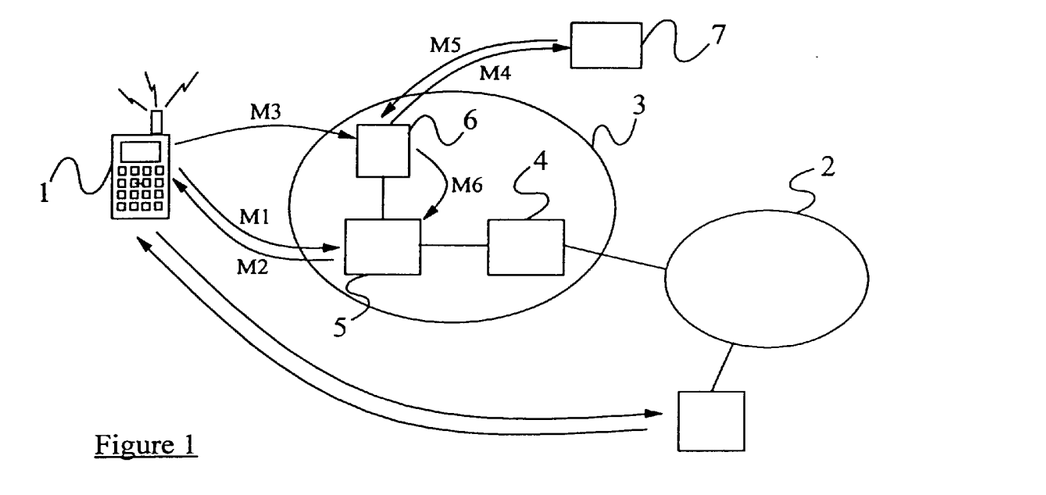
FIG. 1 illustrates schematically a communication system for enabling a mobile IP host to access the Internet.

There is illustrated in FIG. 1 a telecommunications system in which a mobile host 1 is able to communicate with the Internet 2 by making use of an access network 3. In the example to be described here, the access network 3 is a wireless Local Area Network (LAN) whilst the mobile host 1 is a mobile wireless host. More particularly, the wireless LAN 3 is an Ethernet network, with the mobile host 1 comprising an Ethernet "card" which is programmed with an Ethernet address. Typically this address is worldwide unique and is allocated by the card manufacturer. In the example given here, the LAN 3 uses the TCP/IP protocol over the Ethernet connection. As an alternative to wireless LAN, it will be appreciated that other forms of access networks may be used including Wide Area Networks and mobile telecommunications networks (e.g. UMTS and GSM networks).

The wireless LAN 3 is coupled to the Internet 2 via an IP gateway node 4. This gateway node 4 is in turn connected to a number of "primary" IP routers 5 (only one of which is shown in the Figure) within the wireless LAN 3. Each of the primary IP routers 5 provides a gateway between the Ethernet LAN and the IP "world". This function involves protocol conversions if necessary. In addition, the primary routers 5 are involved in the allocation of IP addresses to the mobile hosts, which addresses are world-wide unique.

For the purpose of this example, it is assumed that the mobile host 1 does not have a subscription with the operator of the wireless LAN 3 or with any other network (e.g. LAN, WAN, telephone network etc) with which the wireless LAN 3 has a billing relationship. That is to say that the mobile host 3 does not have a "home" network.

When the mobile host 1 is within the radio coverage area of the wireless LAN 3 and is switched on, the mobile host 1 attempts to make a normal attachment to the wireless LAN 3. It does this via radio transceiver stations which are not illustrated in FIG. 1. The mobile host 1 initiates a negotiation with one of the primary routers 5 (typically the router which is physically closest to the radio transceiver station which handles the host's access), requesting in message M1 an IP address routing prefix from the router. In the case of Internet Protocol version 6 (IPv6), this prefix contains 64 bits and is returned by the router 5 as message M2 to the mobile host 1 over the radio interface. In order to generate a complete IPv6 address, the mobile host 1 adds to the routing prefix an address part which is unique to the mobile host 1. This part may be generated, for example, using the Ethernet card address of the mobile host 1.

Following the return of the IPv6 address prefix from the router 5, and the formulation of the complete IP address, the router 5 does not immediately start coupling IP data packets between the mobile host 1 and the Internet 2. Rather, the router 5 awaits authorisation of the access request from a control point 6 to which the router 5 is connected.

The authorisation process at the control point 6 is conducted as follows. Firstly, upon receipt of the IP routing prefix from the router 5, the mobile host 1 transmits an amount of electronic cash (e-cash) M3 to the control point 6 via the radio transceiver station (and possibly via the router 5). The e-cash is accompanied by the IP address now allocated to the mobile host 1. In order to verify the amount and authenticity of the e-cash, the control point 6 contacts a bank or other e-cash provider 7 which is responsible for the transmitted e-cash. This may involve sending a certificate M4, which accompanies the e-cash, to the bank or e-cash provider 7. In the event that the amount of e-cash is insufficient, or the bank or e-cash provider 7 returns a message M5 indicating that the e-cash is not authentic, the control point 6 will return a fail message M6 to the mobile host 1 (possibly via the router 5) indicating that the access request is denied. The control point 6 will then notify the responsible router 5 of this situation.

Assuming on the other hand that the amount of e-cash sent to the control point 6 is sufficient, and that the bank or e-cash provider 7 returns in message M5 confirmation that the e-cash is authentic, the control point 6 will transmit an authorisation message in message M6 to the responsible router 5. Upon receipt of the authorisation message, the router will start to relay IP packets between the mobile host 1 and the Internet 2. The mobile host 1 is then able to exchange IP data packets with a correspondent host 8, via the Internet.

Figure 2:
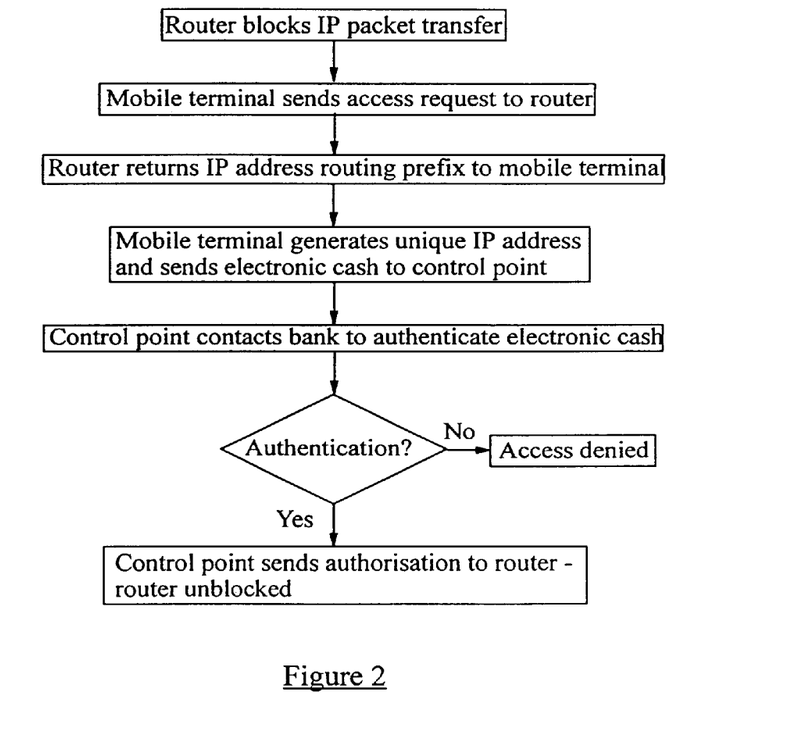
FIG. 2 is a flow diagram illustrating an access method used in the system of FIG. 1.

FIG. 2 is a flow diagram illustrating further the authorisation process described above.

Figure 3A:
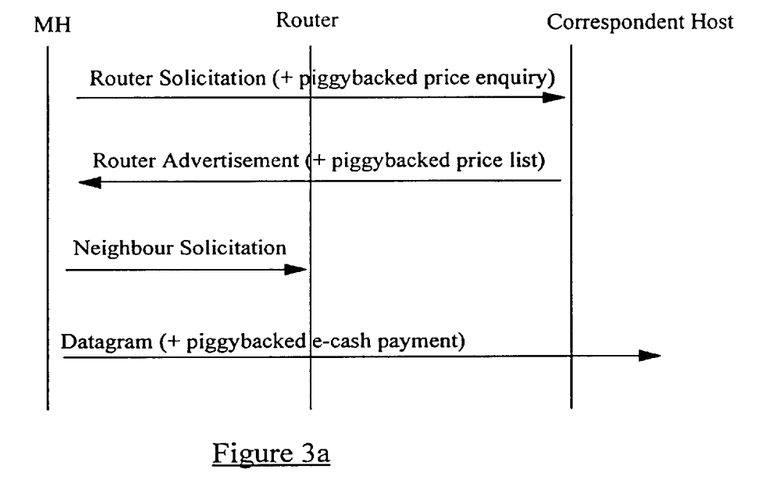
FIG. 3a illustrates signalling between a mobile host and an Internet access network according to a first embodiment of the present invention.

The process described above, where an IP address is generated by the mobile host 1 itself, is referred to as "stateless address allocation". FIG. 3a illustrates the signalling involved in this scenario where it is assumed that the control point 6 is integrated into the router 5 (i.e. in the following discussion it is assumed that communications regarding e-cash may be exchanged between the router 5 and the control point 6). The mobile host 1 first sends a Router Solicitation message to the router 5 of the access network 3. An e-cash enquiry message is "piggybacked" onto the Router Solicitation message. The router 5 responds with a Router Advertisement message telling the mobile host 1 how it must obtain an IP address. In addition, e-cash pricing information is placed in an option field of the Router Advertisement message. The mobile host 1 learns from this message whether the charging is time-based or volume-based, the exact pricing for IP address leasing (e.g. per minute or per kilobyte), and which types of e-cash payment the access network 3 will accept.

The mobile host 1 is able to accept or reject the terms proposed by the network 3. If the terms are accepted, the received information is used to set the e-cash "module" in the mobile host 1 so that the host 1 pays the correct amount of e-cash. The mobile host 1 generates an IP address and validates the address by broadcasting a Neighbour Solicitation message. All of the other hosts connected to the access network 3 listen to this message and will issue a Neighbour Advertisement message if the generated IP address corresponds to an already allocated address (alternatively the Neighbour Advertisement message may be sent to a server in the access network which records currently allocated IP addresses). In the event that there is no reply to the Neighbour Solicitation message, the mobile host 1 starts to send data through the router 5. E-cash is paid to the network 3 by piggybacking e-cash payments onto datagrams sent through the router 5. Typically, e-cash payments are sent at intervals, as requested by the router 5 in the Router Advertisement message.

Figure 3B:
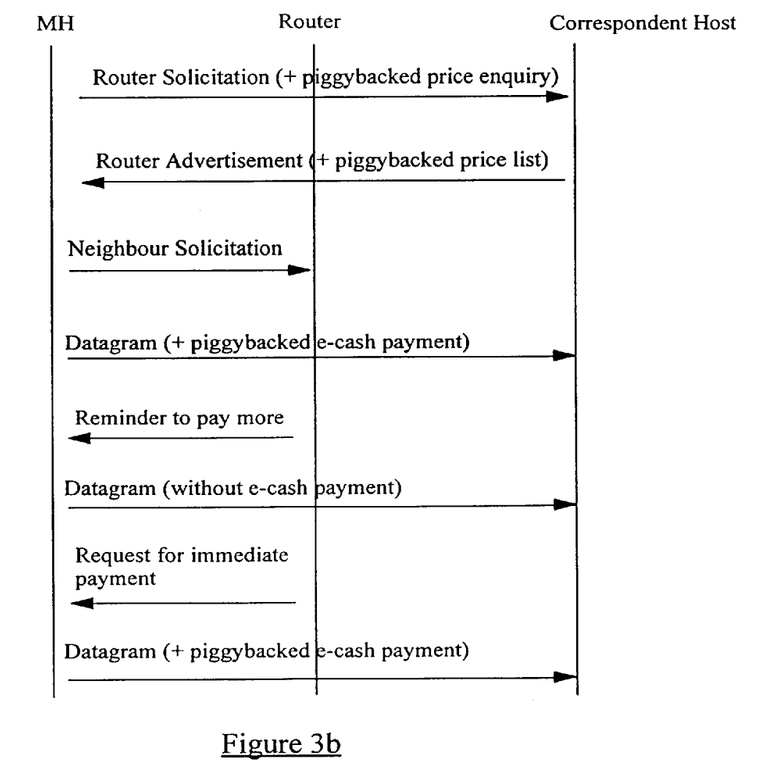

The router 5 extracts the e-cash payment from received datagrams and checks the validity of the payment as described above (using the services of the control point 6). Assuming that the access is authorised on the basis of the received payment, the basic datagram is then forwarded to the intended correspondent host 8 over the Internet 2. It is possible that an e-cash payment may run out if the mobile host 1 has not strictly obeyed the terms provided by the router 5. In this case, the router 5 may send a notify message to the mobile host 1 just prior to the payment running out, reminding the mobile host 1 to make a further payment. The mobile host 1 should respond with a further payment. A Request for Immediate Payment message may be sent to the mobile host 1 by the router 5 in the event that a payment has already run out, notifying the mobile host 1 of this fact and that the router 5 has started to discard received datagrams sent from (or to) the mobile host 1. This scenario is illustrated in FIG. 3b.

It is noted that piggybacked payment related messages, such as a price enquiry or an e-cash payments, may be included into the IPv6 extension header (e.g. the "Hop-by-Hop" option field) of an IP datagram.

Figure 4:
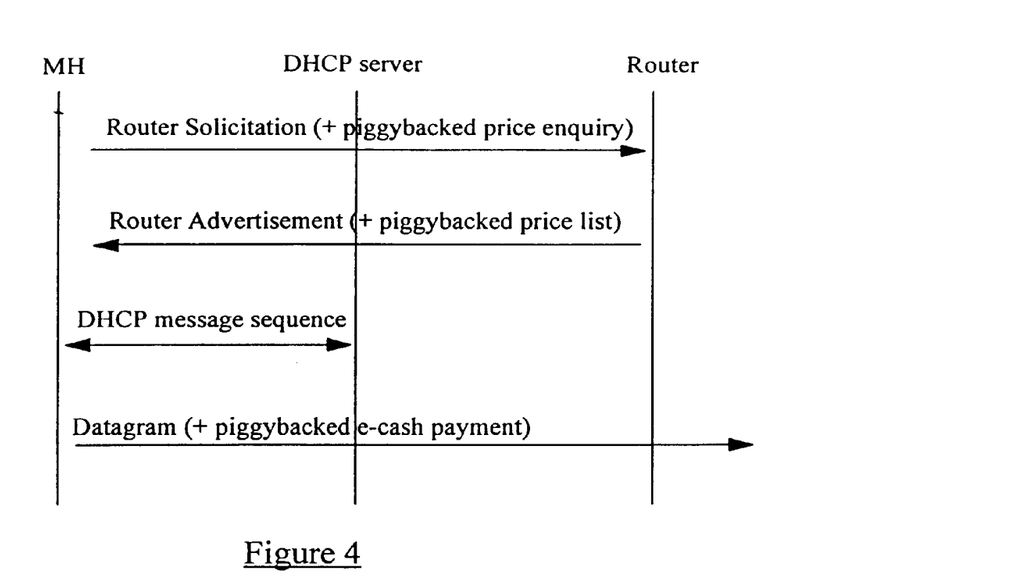
FIG. 4 illustrates signalling between a mobile host and an Internet access network according to a second embodiment of the present invention.

FIG. 4a illustrates an alternative scenario to the stateless address allocation scenario described above. This is referred to as "stateful address allocation" and uses a server (not shown in FIG. 1) in the access network 3 which maintains a list of all of the IP addresses allocated by the network 3. A protocol known as Dynamic Host Configuration Protocol (DHCP) has been specified by the Internet Engineering Task Force (IETF) for negotiating stateful address allocation between the server (DHCP server) and the mobile host 1. As with the stateless address allocation scenario, the process commences with the sending of a Router Solicitation message, containing a piggybacked price enquiry, from the mobile host 1 to the Router 5. The Router 5 again replies with a Router Advertisement message, containing a piggybacked price list. The mobile host 1 learns from the Router Advertisement message that it must obtain an IP address from the DHCP server. It does this using the DHCP protocol, and thereafter e-cash payments are piggybacked on IP datagrams sent to the router 5 (from where they are sent to the control point). Reminder and Request for Immediate Payment messages can be sent from the router 5 to the mobile host 1.

It will be appreciated that in the scenario described above, the DHCP server does not require any modification to implement the invention. However, in order to facilitate time-based charging, a modification may be required to the DHCP server. This takes advantage of the fact that IP addresses allocation by the DHCP server normally have a limited lifetime. After a lifetime has expired, the mobile host must renew the IP address allocation. E-cash payments in respect of IP address renewals may be piggybacked on DHCP address renewal messages.

Figure 5:
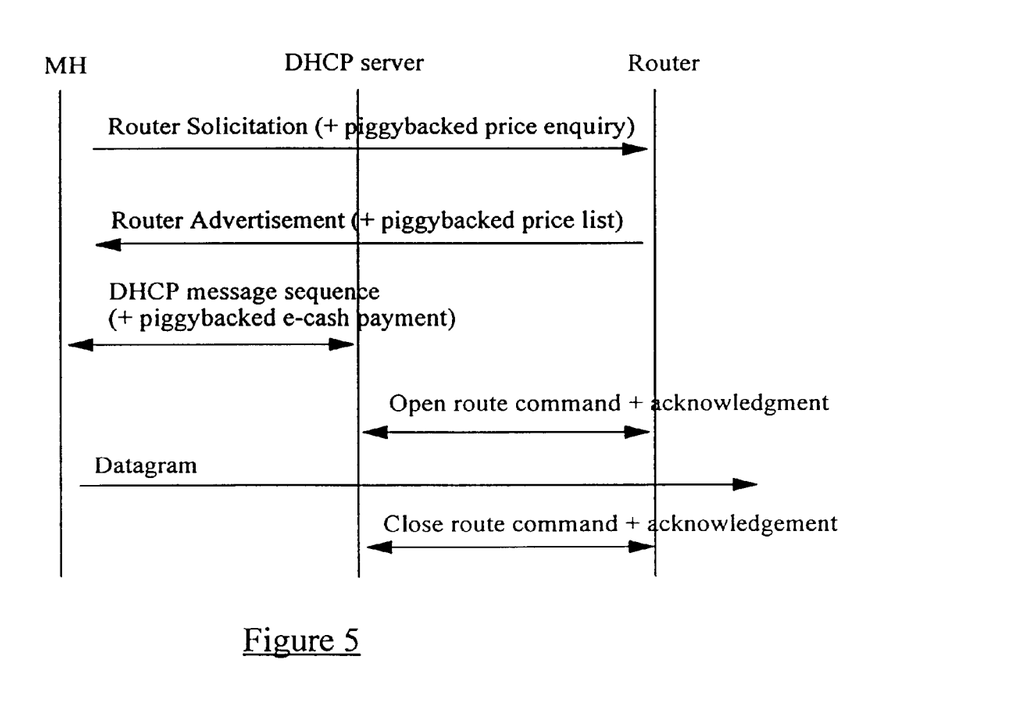
FIG. 5 illustrates signalling between a mobile host and an Internet access network according to a third embodiment of the present invention.

Two new control messages are required; an Open Route message and a Close Route message. These messages are sent from the DHCP server (acting as control point for the IP router) to the router to tell the router either to accept or discard datagrams received from (or sent to) the mobile host. This scenario requires that e-cash functionality be incorporated into the DHCP server, with "opening" and "closing"

route functionality being incorporated into the router. FIG. 5 illustrates the modified scenario.

The system described above works satisfactorily whilst a mobile host remains within one homogeneous network. However, it does not by itself provide for "roaming" between different types of access networks or between networks operated by different operators. When a mobile host "de-registers" with one network and registers with a new network, there is no mechanism for forwarding Internet datagrams, addressed to the old network, to the new network as the communication channel between the mobile host and the old network no longer exists. It is therefore necessary to open a new communication channel between the mobile host and the new network. All datagrams addressed to the old network and not yet received by the mobile host are lost as a result of this channel change. This is obviously not feasible for applications such as voice over IP or video telephony, and may also cause real problems for other applications such as www browsers and file transfers.

A mobile Internet access protocol (IPv6) which provides for roaming is currently being standardised by the Internet Engineering Task Force (IETF). This protocol makes use of a "home agent", located in a mobile host's home network (i.e. the network to which the mobile host subscribes), to keep track of the host when it leaves the home network. A mobile host is fixedly allocated an Internet address (or name) corresponding to the home network.

When a mobile host is registered with its home network, the functionality of the network's home agent is off for that host (i.e. the host is "deregistered" with the home agent) so that the home agent does not alter the flow of datagrams from the Internet to the network's router and the mobile host. When the mobile host leaves its home network and contacts a foreign network (FN), the host is allocated a temporary IP address by the foreign network. The mobile host then transmits the received Internet address to the home network's home agent, together with a registration instruction. The home agent registers the new status of the mobile host and records the newly allocated Internet address as a "care-of-address" for the host. Whenever the mobile host registers with a new foreign network, a new care-of-address is sent to the home network's home agent to replace the previously registered care-of-address.

It will be appreciated that, as a mobile host has a fixed Internet address allocated to it, datagrams destined for the host will at least in the first instance be sent to the home network (the mobile host may subsequently issue a Binding Update notification to the Correspondent host allowing direct communication between the two hosts). If a mobile host has an active Internet connection when it passes from its home network to a foreign network, and a datagram destined for the host subsequently arrives at the home network, the home agent determines that the mobile host is registered with a foreign network and forwards the datagrams to the registered care-of-address. Similarly, if a mobile host initiates a new Internet access when registered with a foreign network, the host continues to use its allocated Internet address. The home agent has already received the care-of-address and can again forward datagrams destined for the mobile host to the foreign network for transfer to the host.

The functionality described above may be implemented in embodiments of the present invention by temporarily allocating a home agent in an access network to a mobile host, where that host has been authorised to use the access network by the payment of e-cash or the like. The allocated home agent acts like a normal home agent for the host, except that when the connection is terminated, e.g. because a payment runs out, the mobile host is deleted from the set of mobile hosts serviced by the home agent. In order to enable correspondent hosts to be able to communicate with a mobile host making use of a dynamically allocated home agent, use is made of a Domain Name System (DNS) server in the Internet which provides a "real" home for the mobile host. The DNS server is notified of the temporary addresses of mobile hosts (which subscribe to the service offered by the DNS server) and maps these to respective permanent IP names of the mobile hosts (e.g. mymobile.dnsserver.com).

Figure 6:
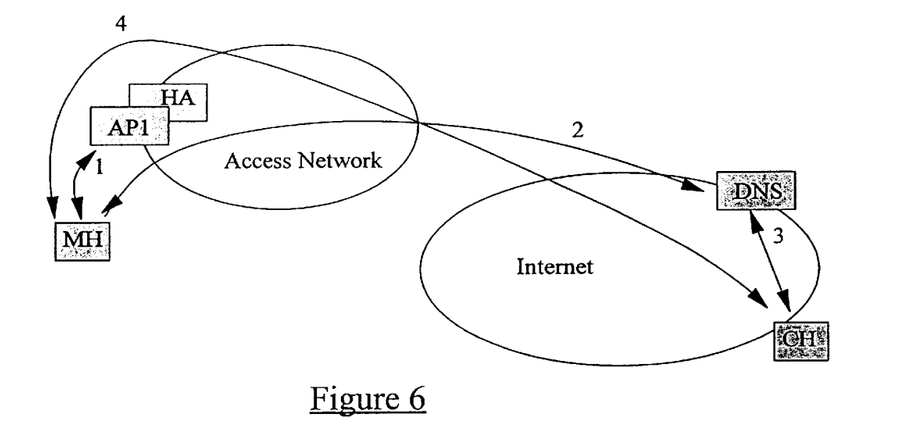
FIG. 6 illustrates signalling between a mobile host, an access network, and the Internet, where the mobile host is temporarily attached to the access network.

With reference to FIG. 6, the following four steps can be identified in establishing a connection between a mobile host (MH) and a correspondent host (CH). The mobile host attaches (step 1) to the access network via an access point ($AP_1$) as described above with reference to FIGS. 1 to 5 (where the access point is a router). The mobile host is allocated a home agent (HA) which is notified of the IP address temporarily allocated to the mobile host. The mobile host notifies (step 2) the DNS (to which it subscribes) of the temporary address which it has been allocated. The DNS maps this address to a permanent IP name of the mobile host.

A correspondent host sends (step 3) an IP address discovery message to the DNS server, the message including the mobile host's IP name (e.g. mymobile.dnsserver.com). The DNS server identifies the current temporary address of the mobile host. The DNS server then returns a message to the correspondent host advising it of the temporary IP address of the mobile host. Once the correspondent host is aware of the temporary address of the mobile host, communication (step 4) can begin between the mobile host and the correspondent host.

Figure 7:
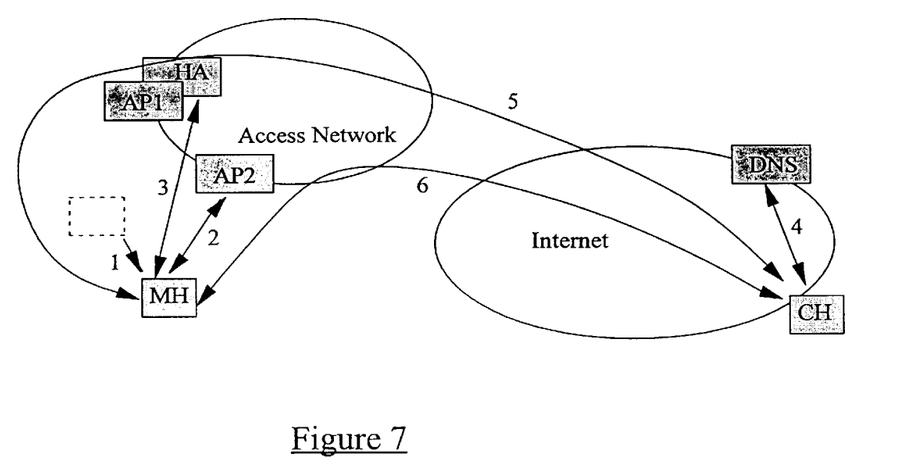
FIG. 7 illustrates signalling where the mobile host of FIG. 6 roams within the access network.
Figure 8:
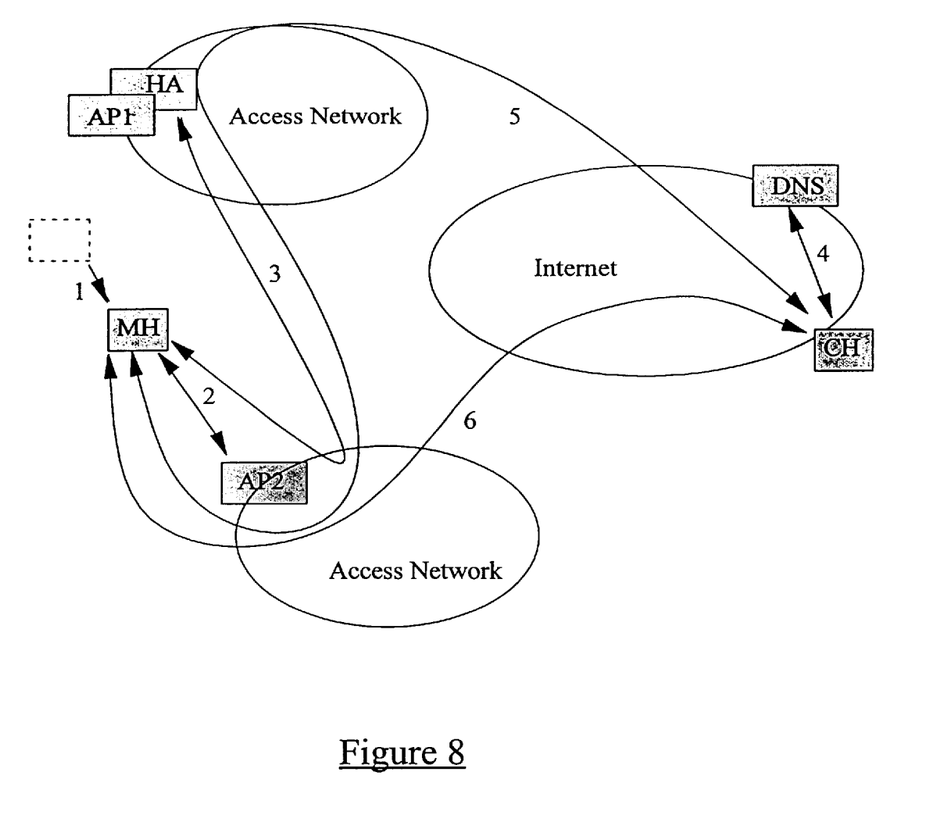
FIG. 8 illustrates signalling where the mobile host of FIG. 6 roams into a new access network.

Two roaming scenarios which make use of the home agent are illustrated in FIGS. 7 and 8. In FIG. 7, a mobile host moves (step 1) within the same access network. As a result of this move, the host connects (step 2) to a new access point ($AP_2$) and receives a new temporary IP address. The mobile host notifies (step 3) the home agent of its new temporary address. When a correspondent host sends an IP address discovery message to the DNS server, as the DNS server has not been updated with the new temporary IP address of the mobile host, but rather still retains the original temporary IP address (allocated by $AP_1$), the correspondent host is notified of the old temporary IP address and thereafter communicates (step 5) directly with the home agent. The home agent handles the routing of received packets to the mobile host by mapping the old temporary address to the new temporary address. The mobile host may subsequently communicate directly (step 6) with the correspondent host in the event that the former send a Binding Update message to the latter. When a mobile host is allocated a new temporary address during an ongoing IP communication, a Binding Update message may be used to inform the correspondent host of the new address.

In the scenario of FIG. 8, the mobile host roams (step 1) from a first to a second access network. Assuming that the mobile host has been authorised for such roaming by the first access network, the home agent allocated to the mobile host in the first network remains responsible for the host even after it has entered the second network. Thereafter, steps 2 to 6 for the scenario of FIG. 8 are substantially the same as for the scenario of FIG. 7, with datagrams from the correspondent host being routed through the home agent of the first network in the first instance. In this scenario, the mobile host may be required to make an additional payment to the new access network in order to enable it to make use of the available IP services.

It will be appreciated by the person of skill in the art that various modifications may be made to the above described embodiments without departing from the scope of the present invention. For example, whilst the above description assumes that the IP address allocation procedure is initiated by the sending of a Router Solicitation message from the mobile host to an IP router, it is possible that the process may be initiated by receipt at the mobile host of a broadcast Router Advertisement message. Rather than send a Router Solicitation message, the mobile host merely listens for Router Advertisement messages which are broadcast periodically be the access network.

What is claimed is:

1. A method of authorizing an Internet Protocol (IP) enabled mobile host to access the Internet via a visited access network, the method comprising:

negotiating an IP address between the mobile host and the visited access network, wherein the mobile host has no direct or indirect billing relationship with the visited access network and the mobile host generates an IP address, which is not associated with any other mobile host connected to the visited access network";

sending one of electronic cash and authentication message to a control point within the visited access network;

determining, at the control point whether the electronic cash is authentic and if the electronic cash is authentic, sending an authorization message from the control point to an IP node within the visited access network, wherein the IP node allows passage of IP packets between the mobile host and the Internet; and if the electronic cash is not authentic, the IP node blocks passage of the IP packets between the mobile host and the Internet.

2. The method according to claim 1, wherein said step of negotiating an IP address is carried out in response to the sending of an IP access request from the mobile host to said IP node within the access network.

3. The method according to claim 1 further comprising routing IP data packets at said IP node.

4. The method according to claim 3, further comprising carrying out a protocol conversion at the IP node between a carrier protocol used by the access network, and protocol used by the Internet.

5. The method according to claim 1 further comprising, upon receipt of the access request at the IP node, returning an IP address prefix from the IP node to the mobile host.

6. The method according to claim 1, wherein said step of negotiating further comprises carrying out a negotiation between the mobile host and a DHCP server of the access network.

7. The method according to claim 1, wherein the access network is one of a wireless Local Area Network (LAN), a Wide Area Network (WAN), a Universal Mobile Telecommunication System (UMTS) network or a Global System for Mobile communications (GSM) network.

8. The method according to claim 1, wherein, upon receipt of electronic cash at the control point, the control point contacts a bank, or other electronic cash provider, to authenticate and ensure the sufficiency of the received electronic cash and, providing that the bank or cash provider returns a confirmation or authentication message to the control point, the control point sends the authorization message to the IP node in order to allow the passage of IP data packets between the mobile host and the Internet.

9. The method according to claim 1 further comprising incorporating electronic cash payments into IP packets sent from the mobile host to the control point.

10. The method according to claim 9, wherein the IP router is co-located with the control point.

11. The method according to claim 9, wherein said control point is co-located with a DHCP server, the DHCP server allocating an IP address to the mobile host during the IP address negotiation.

12. The method according to claim 1, wherein said IP node is an IP router.

13. The method of claim 1 further comprising the step of temporarily allocating to the mobile host a home agent located in the visited access network, wherein the home agent can communicate with a home agent in the mobile host's home network.

14. The method according to claim 13, wherein the allocation of the home agent exists for the duration of the Internet connection.

15. The method according to claim 14 further comprising informing an Internet server of the IP address allocated to the mobile host, the server maintaining a mapping between mobile host identities and temporary IP addresses for subscribing mobile hosts.

16. The method according to claim 15, wherein the Internet server is a Domain Name Server (DNS).

17. The method according to claim 14 further comprising informing an Internet server of the location of the mobile host, the server maintaining a mapping between mobile host identifies and locations for subscribing mobile hosts.

18. An apparatus for use in enabling an Internet Protocol (IP) enabled mobile host to access the Internet via a visited access network, the apparatus comprising:

means for negotiating an IP address between the mobile host and the visited access networks, wherein the mobile host has no direct or indirect billing relationship with the visited access network and the mobile host determines whether the IP address is associated with any other mobile host connected to the visited access network, and a control point within the visited access network for receiving electronic cash from the mobile host and for determining whether the received electronic cash is authentic and if the received electronic cash is authentic sending an authorization message to an IP node within the visited access network, the IP node being arranged to block the transfer of messages between the mobile host and the Internet prior to receipt of an authorization message from the control point and to allow the transfer of the messages upon receipt of the authorization message.

19. The apparatus of claim 18, further comprising:

means for temporarily allocating to the mobile host a home agent located in the visited access network; and means for establishing a communication link between a correspondent agent in said mobile host's home network and said mobile host.

* * * * *